US009266316B2

(12) United States Patent
Melamed et al.

(10) Patent No.: US 9,266,316 B2
(45) Date of Patent: Feb. 23, 2016

(54) DUAL-LAYER LASER-IMAGEABLE FLEXOGRAPHIC PRINTING PRECURSORS

(75) Inventors: Ophira Melamed, Shoham (IL); Eynat Matzner, Adi (IL); Dana Barshishat, Petah-Tiqva (IL)

(73) Assignee: EASTMAN KODAK COMPANY, Rochester, NY (US)

( * ) Notice: Subject to any disclaimer, the term of this patent is extended or adjusted under 35 U.S.C. 154(b) by 816 days.

(21) Appl. No.: 13/352,586

(22) Filed: Jan. 18, 2012

(65) Prior Publication Data

US 2013/0183502 A1 Jul. 18, 2013

(51) Int. Cl.

*B32B 7/02* (2006.01)
*B28B 7/36* (2006.01)
*B29C 59/16* (2006.01)
*B41C 1/05* (2006.01)
*B41N 1/12* (2006.01)

(52) U.S. Cl.

CPC ... *B41C 1/05* (2013.01); *B41N 1/12* (2013.01); *Y10T 428/24942* (2015.01)

(58) Field of Classification Search

CPC .......... B32B 27/36; B32B 27/08; B32B 7/02; G11B 5/716; B23K 26/4065; B23K 26/381; B23K 26/0656; B29C 59/16; B29C 2035/0838; B22C 3/00; B22C 33/56; B22C 23/02; B22C 33/58; B28B 7/384

USPC ............................ 428/212; 264/400; 427/133

See application file for complete search history.

(56) References Cited

U.S. PATENT DOCUMENTS

| | | | | |
|---|---|---|---|---|
| 4,060,032 | A | 11/1977 | Evans | |
| 5,719,009 | A | 2/1998 | Fan | |
| 5,780,200 | A | 7/1998 | Kitaguchi et al. | |
| 5,798,202 | A | 8/1998 | Cushner et al. | |
| 6,090,529 | A | 7/2000 | Gelbart | |
| 6,159,659 | A | 12/2000 | Gelbart | |
| 6,806,018 | B2 | 10/2004 | Kanga et al. | |
| 6,989,220 | B2 | 1/2006 | Kanga | |
| 7,811,744 | B2 | 10/2010 | Figov | |
| 7,947,426 | B2 | 5/2011 | Figov et al. | |
| 2002/0115019 | A1 * | 8/2002 | Kaczun et al. | 430/273.1 |
| 2008/0087181 | A1 | 4/2008 | Goichman et al. | |
| 2008/0258344 | A1 | 10/2008 | Regan et al. | |
| 2009/0214983 | A1 * | 8/2009 | Figov et al. | 430/300 |
| 2010/0283187 | A1 * | 11/2010 | Figov | B41N 1/12 264/400 |
| 2011/0014573 | A1 | 1/2011 | Matzner et al. | |
| 2011/0089609 | A1 | 4/2011 | Landry-Coltrain et al. | |
| 2013/0001832 | A1 * | 1/2013 | Melamed | C08L 23/16 264/400 |
| 2013/0009346 | A1 * | 1/2013 | Melamed | B41C 1/05 264/400 |
| 2013/0029102 | A1 * | 1/2013 | Landry-Coltrain | B41C 1/05 428/159 |
| 2013/0101834 | A1 * | 4/2013 | Barshishat | B41C 1/05 428/332 |
| 2013/0147094 | A1 * | 6/2013 | Melamed | B41C 1/05 264/482 |
| 2013/0288006 | A1 * | 10/2013 | Greene | B41C 1/05 428/156 |
| 2013/0288033 | A1 * | 10/2013 | Costy | B41C 1/05 428/220 |

* cited by examiner

*Primary Examiner* — Tahseen N Khan

(74) *Attorney, Agent, or Firm* — J. Lanny Tucker

(57) ABSTRACT

A flexographic printing precursor can be imaged and used for flexographic printing. This precursor has at least two laser-engraveable layers, in which the underlying non-printing laser-engraveable layer is more sensitive than the outermost non-metallic printing laser-engraveable layer. The non-printing layer-engraveable layer comprises (1) a first elastomer, (2) a polymer that is nitrocellulose, a polymer comprising a triazene group, a glycidyl azide polymer, or a poly(vinyl nitrate), and (3) a first near-infrared radiation absorber. The outermost non-metallic printing laser-engraveable layer comprises a second elastomer and a second infrared radiation absorber.

13 Claims, No Drawings

DUAL-LAYER LASER-IMAGEABLE FLEXOGRAPHIC PRINTING PRECURSORS

FIELD OF THE INVENTION

This invention relates to laser-imageable (laser-engraveable) flexographic printing precursors comprising two different laser-engraveable layers disposed over a substrate. The underlying non-printing laser-engraveable layer is more sensitive to laser infrared radiation than the outermost non-metallic printing laser-engraveable layer. This invention also relates to methods of imaging these flexographic printing precursors to provide flexographic printing members in various forms, and to methods of making the flexographic printing precursors.

BACKGROUND OF THE INVENTION

Flexography is a method of printing that is commonly used for high-volume printing runs. It is usually employed for printing on a variety of soft or easily deformed materials including but not limited to, paper, paperboard stock, corrugated board, polymeric films, fabrics, metal foils, and laminates. Coarse surfaces and stretchable polymeric films are economically printed using flexography.

Flexographic printing members are sometimes known as "relief" printing members (for example, relief-containing printing plates, printing sleeves, or printing cylinders) and are provided with raised relief images onto which ink is applied for application to a printable material. While the raised relief images are inked, the relief "floor" should remain free of ink. The flexographic printing precursors are generally supplied with one or more imageable layers that can be disposed over a backing layer or substrate. Flexographic printing also can be carried out using a flexographic printing cylinder or seamless sleeve having the desired relief image. These flexographic printing members can be provided from flexographic printing precursors that can be "imaged in-the-round" (ITR) using either a photomask or laser-ablatable mask (LAM) over a photosensitive composition (layer), or they can be imaged by direct laser engraving (DLE) of a laser-engraveable composition (layer) that is not necessarily photosensitive.

Flexographic printing precursors having laser-ablatable layers are described for example in U.S. Pat. No. 5,719,009 (Fan), which precursors include a laser-ablatable mask layer over one or more photosensitive layers. This publication teaches the use of a developer to remove unreacted material from the photosensitive layer, the barrier layer, and non-ablated portions of the mask layer.

There has been a desire in the industry for a way to prepare flexographic printing members without the use of photosensitive layers that are cured using UV or actinic radiation and that require liquid processing to remove non-imaged composition and mask layers. Direct laser engraving of precursors to produce relief printing plates and stamps is known, but the need for relief image depths greater than 500 μm creates a considerable challenge when imaging speed is also an important commercial requirement. In contrast to laser ablation of mask layers that require low to moderate energy lasers and fluence, direct engraving of a relief-forming layer requires much higher energy and fluence. A laser-engraveable layer must also exhibit appropriate physical and chemical properties to achieve "clean" and rapid laser engraving (high sensitivity) so that the resulting printed images have excellent resolution and durability.

A number of elastomeric systems have been described for construction of laser-engravable flexographic printing precursors. For example, U.S. Pat. No. 6,223,655 (Shanbaum et al.) describes the use of a mixture of epoxidized natural rubber and natural rubber in a laser-engraveable composition. Engraving of a rubber is also described by S. E. Nielsen in *Polymer Testing* 3 (1983) pp. 303-310.

EP 1,228,864 (Houstra) describes liquid photopolymer mixtures that are designed for UV imaging and curing, and the resulting printing plate precursors are laser-engraved using carbon dioxide lasers operating at about 10 μm wavelength. Such printing plate precursors are unsuitable for imaging using more desirable near-IR absorbing laser diode systems. U.S. Pat. No. 5,798,202 (Cushner et al.) describes the use of reinforced block copolymers incorporating carbon black in a layer that is UV cured and remains thermoplastic. Such block copolymers are used in many commercial UV-sensitive flexographic printing plate precursors. As pointed out in U.S. Pat. No. 6,935,236 (Hiller et al.), such curing would be defective due to the high absorption of UV as it traverses through the thick imageable layer. Although many polymers are suggested for this use in the literature, only extremely flexible elastomers have been used commercially because flexographic layers that are many millimeters thick must be designed to be bent around a printing cylinder and secured with temporary bonding tape and both must be removable after printing.

An increased need for higher quality flexographic printing precursors for laser engraving has highlighted the need to solve performance problems that were of less importance when quality demands were less stringent. However, it has been especially difficult to simultaneously improve the flexographic printing precursor in various properties because a change that can solve one problem can worsen or cause another problem.

For example, the rate of imaging is an important consideration in laser engraving of flexographic printing precursors. Throughput (rate of imaging multiple precursors) by engraving depends upon printing plate precursor width because each precursor is imaged point by point. Imaging, multi-step processing, and drying of UV-sensitive precursors is time consuming but this process is independent of printing plate size, and for the production of multiple flexographic printing plates, it can be relatively fast because many flexographic printing plates can be passed through the multiple stages at the same time.

In contrast, throughput using laser-engraving is somewhat determined by the equipment that is used, but if this is the means for improving imaging speed, the cost becomes the main concern. Improved imaging speed is thus related to equipment cost. There is a limit to what the market will bear in equipment cost in order to have faster imaging. Therefore, much work has been done to try to improve the sensitivity of the flexographic printing plate precursors by various means. For instance, U.S. Pat. No. 6,090,529 (Gelbart) and U.S. Pat. No. 6,159,659 (Gelbart) describe the use of a foam layer for laser engraving so that there is less material to ablate. U.S. Pat. No. 6,806,018 (Kanga) uses expandable microspheres to increase precursor sensitivity.

U.S. Patent Application Publication 2009/0214983 (Figov et al.) describes the use of additives that thermally degrade during imaging to produce gaseous products. U.S. Patent Application Publication 2008/0194762 (Sugasaki) suggests that good imaging sensitivity can be achieved using a polymer with a nitrogen atom-containing hetero ring. U.S. Patent Application Publication 2008/0258344 (Regan et al.) describes laser-ablatable flexographic printing precursors that can be degraded to simple molecules that are easily removed.

U.S. Patent Application Publication 2011/0089609 (Landry-Coltrain et al.) describes laser-engraveable elements that exhibit increased engraving efficiency so as to increase flexographic printing plate imaging speed and throughput. These advantages are achieved by using at least one laser-ablatable, relief-forming layer comprising a thermoplastic urethane or elastomer and an infrared radiation absorbing compound that is present at a concentration profile such that its concentration is greater near the bottom surface of the layer than the relief image-forming surface, and such concentration is not absolutely zero at the relief image-forming surface.

U.S. Patent Application Publication 2011/0014573 (Matzner et al.) describes a system for engraving flexographic printing plates including a flexographic printing plate having at least two ablation layers (for example in FIG. 4). The underlying layer can be softer and less durable than the overlying printing layer. Both layers can comprise thermosetting elastomers such as polyurethanes.

However, there continues to be a need to improve both the sensitivity and manufacturability of laser-engraveable flexographic printing precursors. It would be particularly useful to achieve these advantages using near-IR laser-engraving because of the advantages associated with the use of near-IR lasers compared to engraving using carbon dioxide lasers.

In addition, there is a desire to improve sensitivity, to reduce imaging time, and to increase throughput of an imaging engraving apparatus. Also, there is a desire to achieve good quality solids and dot reproduction even when printing is performed at high speeds.

SUMMARY OF THE INVENTION

The present invention provides a flexographic printing precursor that is laser-engraveable to provide a relief image, the flexographic printing precursor comprising a substrate, and having disposed over the substrate, in order:

a non-printing laser-engraveable layer comprising: (1) a first elastomer, (2) a polymer that is nitrocellulose, a polymer comprising a triazene group, a glycidyl azide polymer, or a poly(vinyl nitrate), and (3) a first near-infrared radiation absorber, and an outermost non-metallic printing laser-engraveable layer disposed over the non-printing laser-engraveable layer, the outermost non-metallic, printing laser-engraveable layer comprising: (1) a second elastomer and (2) a second near-infrared radiation absorber, wherein the non-printing laser-engraveable layer is more sensitive to laser irradiation at a wavelength of at least 700 nm and up to and including 1300 nm than the outermost non-metallic printing laser-engraveable layer.

This invention also provides a method for providing a flexographic printed impression, comprising:

imaging the flexographic printing precursor of this invention (for example, as described above) using near-infrared radiation to provide a flexographic printing member with a relief image.

Moreover, in some embodiments, this method further comprises:

applying ink to the flexographic printing member of this invention having the relief image, and transferring ink from the flexographic printing member to a receiver element to provide a printed impression.

This invention further provides method for making a flexographic printing precursor of this invention, comprising:

forming a non-printing laser-engraveable layer over a substrate, the non-printing laser-engraveable layer comprising: (1) a first elastomer, (2) a polymer that is nitrocellulose, a polymer comprising a triazene group, a glycidyl azide polymer, or a poly(vinyl nitrate), and (3) a first near-infrared radiation absorber, and forming an outermost non-metallic printing laser-engraveable layer over the non-printing laser-engraveable layer, the outermost non-metallic, printing laser-engraveable layer comprising: (1) a second elastomer and (2) a second near-infrared radiation absorber, wherein the formed non-printing laser-engraveable layer is more sensitive to laser irradiation at a wavelength of at least 700 nm and up to and including 1300 nm than the formed outermost non-metallic printing laser-engraveable layer.

The present invention provides a number of advantages because at least two laser-engraveable layers are used together, and because of their unique compositions. Thus, the underlying non-printing laser-engraveable layer is more sensitive to the imaging laser radiation than the outermost non-metallic printing laser-engraveable layer. There are several advantages from this unique arrangement of laser-engraveable layers used in the present invention.

The non-printing laser-engraveable layer leaves reduced debris during imaging because it can be covalently adhered to the outermost non-metallic printing laser-engraveable layer. Thus, the laser-engraved flexographic members are more easily cleaned and handled after formation of the relief image.

Thus, it has been unexpectedly found that materials that are normally not used as a printing surface in flexographic printing precursors can be disposed in a separate layer underneath the printing surface and actually improve the efficiency of the direct engraving process of both the printing surface layer and the underlying laser-engraveable layer. The flexographic printing precursors of this invention exhibit improved printing performance than precursors having a single laser-engraveable layer having the same composition as the non-printing laser-engraveable layer.

DETAILED DESCRIPTION OF THE INVENTION

Definitions

As used herein to define various components of the laser-engraveable compositions, formulations, and layers, unless otherwise indicated, the articles "a", "an", and "the" are intended to include one or more of the components.

The term "imaging" refers to ablation (or engraving) of the background areas while leaving intact the areas of the flexographic printing precursor that will be inked up and printed using a flexographic ink.

The term "flexographic printing precursor" refers to a non-imaged flexographic element of this invention. The flexographic printing precursors include flexographic printing plate precursors, flexographic printing sleeve precursors, and flexographic printing cylinder precursors, all of which can be laser-engraved to provide a relief image using a laser according to the present invention to have a dry relief image depth of at least 50 μm (minimum) and up to and including 4000 μm. Such laser-engraveable, relief-forming precursors can also be known as "flexographic printing plate blanks", "flexographic printing cylinders", or "flexographic sleeve blanks". The laser-engraveable flexographic printing precursors can also have seamless or continuous forms.

By "laser-engraveable", we mean that the laser-engraveable (or imageable) layer(s) can be imaged using a suitable laser-engraving source including infrared radiation lasers, for example carbon dioxide lasers and near-infrared radiation lasers such as Nd:YAG lasers, laser diodes, and fiber lasers. Absorption of energy from these lasers produces heat within the laser-engraveable layer that causes rapid local changes in the laser-engraveable layer so that the imaged regions are physically detached from the rest of the layer or substrate and ejected from the layer and collected using suitable means. Non-imaged regions of the laser-engraveable layer(s) are not removed or volatilized to an appreciable extent and thus form the upper surface of the relief image that is the flexographic printing surface. The layer(s) breakdown is a violent process that includes eruptions, explosions, tearing, decomposition, fragmentation, oxidation, or other destructive processes that create a broad collection of solid debris and gases. "Laser-ablative" and "laser-engraveable" can be used interchangeably in the art, but for purposes of this invention, the term "laser-engraveable" is used to define imaging according to the present invention in which a relief image is formed in the laser-engraveable layer. It is distinguishable from image transfer methods in which ablation is used to materially transfer pigments, colorants, or other image-forming components. The present invention is also distinguished from laser ablation of a thin layer to create a mask that is used to imagewise block curing radiation that is used to make a flexographic or lithographic printing plate.

Unless otherwise indicated, the term "weight %" refers to the amount of a component or material based on the total dry layer weight of the composition or layer in which it is located.

Unless otherwise indicated, the terms "laser-engraveable composition" and "laser-engravable layer formulation" are intended to be the same.

The "top surface" is equivalent to the "relief-image forming surface" and is defined as the outermost surface of the outermost printing laser-engraveable layer and is the first surface of that layer that is struck by imaging (engraving) radiation during the engraving or imaging process. The "bottom surface" is defined as the surface of the laser-engraveable layer that is most distant from the imaging radiation.

The term "elastomeric rubber" refers to rubbery materials that generally regain their original shape when stretched or compressed.

Flexographic Printing Precursors

The flexographic printing precursors of this invention are laser-engraveable to provide a desired relief image, and comprise at least two different laser-engraveable layers disposed over a substrate (described below). In many embodiments, these precursors have only two laser-engraveable layers that are directly disposed on the substrate. For example, a non-printing laser-engraveable layer is disposed over the substrate (or it is disposed directly on the substrate), and an outermost non-metallic printing laser-engraveable layer is disposed over the non-printing laser-engraveable layer (or it is disposed directly on the non-printing laser-engraveable layer.

It is essential that the non-printing laser-engraveable layer is more sensitive to laser irradiation at a wavelength of at least 700 nm and up to and including 1300 nm than the outermost non-metallic printing laser-engraveable layer. The ways this differentiation in sensitivity can be provided is described in more detail below.

Non-Printing Laser-Engraveable Layer

The non-printing laser-engraveable layer is not generally used for flexographic printing after a relief image is formed because the outermost non-metallic printing laser-engraveable layer is disposed over it and forms the printing surface in the relief image. However, this laser-engraveable layer can still be partially or wholly laser engraved in the formation of the relief image.

The non-printing laser-engraveable layer comprises three essential components:

(1) The first component is one or more elastomers ("first elastomer") that can be chosen from any non-EPDM elastomeric rubbers, including but not limited to, thermosetting or thermoplastic polyurethane resins that are derived from the reaction of a polyol (such as polymeric diol or triol) with a polyisocyanate or the reaction of a polyamine with a polyisocyanate, copolymers of styrene and butadiene, copolymers of isoprene and styrene, styrene-butadiene-styrene block copolymers, styrene-isoprene-styrene copolymers, other polybutadiene or polyisoprene elastomers, nitrile elastomers, polychloroprene, polyisobutylene and other butyl elastomers, any elastomers containing chlorosulfonated polyethylene, polysulfide, polyalkylene oxides, or polyphosphazenes, elastomeric polymers of (meth)acrylates, elastomeric polyesters, and other similar polymers known in the art. Polyurethanes are particularly useful, either alone, as the first elastomer, or in a mixture with other elastomers.

Still other useful elastomers include vulcanized rubbers, such as Nitrile (Buna-N), Natural rubber, Neoprene or chloroprene rubber, silicone rubber, fluorocarbon rubber, fluorosilicone rubber, SBR (styrene-butadiene rubber), NBR (acrylonitrile-butadiene rubber), ethylene-propylene rubber, and butyl rubber. Other useful elastomers include but are not limited to, poly(cyanoacrylate)s that include recurring units derived from at least one alkyl-2-cyanoacrylate monomer and that forms such monomer as the predominant low molecular weight product during laser-engraving. These polymers can be homopolymers of a single cyanoacrylate monomer or copolymers derived from one or more different cyanoacrylate monomers, and optionally other ethylenically unsaturated polymerizable monomers such as (meth)acrylate, (meth) acrylamides, vinyl ethers, butadienes, (meth)acrylic acid, vinyl pyridine, vinyl phosphonic acid, vinyl sulfonic acid, and styrene and styrene derivatives (such as α-methylstyrene), as long as the non-cyanoacrylate comonomers do not inhibit the ablation process. The monomers used to provide these polymers can be alkyl cyanoacrylates, alkoxy cyanoacrylates, and alkoxyalkyl cyanoacrylates. Representative examples of poly (cyanoacrylates) include but are not limited to poly(alkyl cyanoacrylates) and poly(alkoxyalkyl cyanoacrylates) such as poly(methyl-2-cyanoacrylate), poly(ethyl-2-cyanoacrylate), poly(methoxyethyl-2-cyanoacrylate), poly(ethoxyethyl-2-cyanoacylate), poly(methyl-2-cyanoacrylate-co-ethyl-2-cyanoacrylate), and other polymers described in U.S. Pat. No. 5,998,088 (Robello et al.).

Yet other elastomers are alkyl-substituted polycarbonate or polycarbonate block copolymers that form a cyclic alkylene carbonate as the predominant low molecular weight product during depolymerization from ablation. The polycarbonates can be amorphous or crystalline as described for example in Cols. 9-12 of U.S. Pat. No. 5,156,938 (Foley et al.).

The first elastomers useful in the non-printing laser-engraveable layer can be purchased from a number of commercial sources or prepared using known synthetic methods and starting materials.

The first elastomer is generally present in the non-printing laser-engraveable layer in an amount of at least 20 weight % and up to and including 80 weight %, or typically in an amount of at least 40 weight % and up to and including 80 weight %, based on the total dry weight of the non-printing laser-engraveable layer.

(2) A second essential component in the non-printing laser-engraveable layer is a polymer chosen from nitrocellulose (that is meant to include any derivatives of nitrocellulose), a polymer comprising a triazene group, a glycidyl azide polymer, and a poly(vinyl nitrate). Mixtures of these polymers can also be used. Nitrocellulose is particularly useful. These polymers can be prepared using known starting materials and synthetic procedures. Some can be purchased from commercial sources. Several commercial grades of nitrocellulose can be used including Nitrocellulose RS 0.5 (from TNC Industrial Co.), or Walsroder NC-chips A-400 or E-330 (from Dowwolff Cellulosics).

The (2) polymer can be present in the non-printing laser-engraveable layer in an amount of at least 5 weight % and up to and including 20 weight %, or typically in an amount of at least 7 weight % and up to and including 15 weight %, based on the total dry weight of the non-printing laser-engraveable layer.

In addition, the weight ratio of the (1) first elastomer to the (2) polymer, both described above, is from 1:1 to and including 16:1, or typically from 3:1 to and including 9:1.

The presence of polymer (2) renders the non-printing laser-engraveable layer more sensitive to laser irradiation at a wavelength (any wavelength chosen by the user) of at least 700 nm and up to and including 1300 nm than the outermost non-metallic printing laser-engraveable layer (described below). The polymer (2) is not present in the outermost non-metallic printing laser-engraveable layer to any appreciable extent, that is, less than 5 weight %, and typically less than 1 weight %, based on the total dry weight of the non-printing laser-engraveable layer.

(3) The non-printing laser-engraveable layer also comprises one or more infrared radiation absorber ("first" infrared radiation absorber), that can be chosen from the materials described below. A conductive or non-conductive carbon black is particularly useful.

The non-printing laser-engraveable layer can also comprise any of the optional additives that are described below, including for example, inorganic non-infrared radiation absorber fillers, microcapsules, dispersants, adhesion promoters, and coupling agents, in amounts that are known in the art.

The non-printing laser-engraveable layer generally has a dry thickness of at least 250 μm and up to and including 4,000 μm, or typically at least 300 μm and up to and including 2,500 μm.

Outermost Non-Metallic Printing Laser-Engraveable Layer

The outermost non-metallic printing laser-engraveable layer forms the flexographic printing surface of the relief image. This layer comprises one or more elastomers ("second" elastomer) that can be chosen from the elastomers described above for the non-printing layer-engraveable layer. The first and second elastomers used in the respective laser-engraveable layers can be the same or different elastomers. For example, the first elastomer can be polyurethane and the second elastomer can be a different elastomer, but in other embodiments, the first and second elastomers can be the same, for example, both can be polyurethane.

The outermost non-metallic printing laser-engraveable layer also comprises one or more infrared radiation absorbers ("second" infrared radiation absorber), which are described below in more detail. For example, a conductive or non-conductive carbon black can be used as a second infrared radiation absorber. The first and second infrared radiation absorbers can be the same or different materials.

The outermost non-metallic printing laser-engraveable layer can also comprise any of the optional additives that are described below, including for example, inorganic non-infrared radiation absorber fillers, microcapsules, dispersants, adhesion promoters, and coupling agents, in amounts that are known in the art.

The outermost non-metallic printing laser-engraveable layer generally has a dry thickness of at least 100 μm and up to and including 4,000 μm, or typically at least 250 μm and up to and including 4,000 μm.

Since the non-printing laser-engraveable layer is generally at least partially laser-engraved, its upper surface should be within 50 μm to 4,000 μm (or typically within 100 μm to 600 μm) of the outermost surface of the outermost non-metallic printing laser-engraveable layer.

In some embodiments of the flexographic printing precursors of this invention, the non-printing laser-engraveable layer comprises a polyurethane, a carbon black, and nitrocellulose, and the outermost non-metallic, printing laser-engraveable layer comprises a polyurethane and a carbon black.

Infrared Radiation Absorber

As noted above, each laser-engraveable layer comprises one or more near-IR (near-infrared) or IR (infrared) radiation absorbers that facilitate or enhance laser engraving to form a relief image. The infrared radiation absorbers have maximum absorption at a wavelength ($\lambda_{max}$) of at least 700 nm and at greater wavelengths in what is known as the infrared portion of the electromagnetic spectrum, and up to and including 1300 nm. In particularly useful embodiments, the radiation absorber is a near-infrared radiation absorber having a $\lambda_{max}$ of at least 700 nm and up to and including 1250 nm, or more typically of at least 800 nm and up to and including 1250 nm. If multiple engraving means having different engraving wavelengths are used, multiple near-infrared radiation absorbers can be used.

Particularly useful near-infrared radiation absorbers are responsive to exposure from near-IR lasers. Mixtures of the same or different types of near-infrared radiation absorbers can be used if desired in each of the laser-engraveable layers. A wide range of useful near-infrared radiation absorbers include but are not limited to, carbon blacks and other near-IR radiation absorbing organic or inorganic pigments (including squarylium, cyanine, merocyanine, indolizine, pyrylium, metal phthalocyanines, and metal dithiolene pigments), and metal oxides.

Examples of useful carbon blacks include RAVEN® 450, RAVEN® 760 ULTRA®, RAVEN® 890, RAVEN® 1020, RAVEN® 1250 and others that are available from Columbian Chemicals Co. (Atlanta, Ga.) as well as N 293, N 330, N 375, and N 772 that are available from Evonik Industries AG (Switzerland) and Mogul® L, Mogul® E, Emperor 2000, and Regal® 330, and 400, that are available from Cabot Corporation (Boston Mass.). Both non-conductive and conductive carbon blacks (described below) are useful. Some conductive carbon blacks have a high surface area and a dibutyl phthalate (DBP) absorption value of at least 150 ml/100 g, as described for example in U.S. Pat. No. 7,223,524 (Hiller et al.) and measured using ASTM D2414-82 DBP Absorption of Carbon Blacks. Carbon blacks can be acidic or basic in nature. Useful conductive carbon blacks also can be obtained commercially as Ensaco™ 150 P (from Timcal Graphite and Carbon), Hi Black 160 B (from Korean Carbon Black Co. Ltd.), and also include those described in U.S. Pat. No. 7,223,524 (noted above, Col. 4, lines 60-62) that is incorporated herein by reference. Useful carbon blacks also include those that are surface-functionalized with solubilizing groups, and carbon blacks that are grafted to hydrophilic, nonionic polymers, such as FX-GE-003 (manufactured by Nippon Shokubai).

Other useful near-infrared radiation absorbing pigments include, but are not limited to, Heliogen Green, Nigrosine Base, iron (III) oxides, transparent iron oxides, magnetic pigments, manganese oxide, Prussian Blue, and Paris Blue. Other useful near-infrared radiation absorbers include carbon nanotubes, such as single- and multi-walled carbon nanotubes, graphite (including porous graphite), graphene, and carbon fibers.

A fine dispersion of very small particles of pigmented near-infrared radiation absorbers can provide an optimum laser-engraving resolution and ablation efficiency. Suitable pigment particles are those with diameters less than 1 μm.

Dispersants and surface functional ligands can be used to improve the quality of the carbon black, metal oxide, or pigment dispersion so that the near-infrared radiation absorber is uniformly incorporated throughout the laser-engraveable layer.

The first and second near-infrared radiation absorbers can be the same or different and selected from the group consisting of a conductive or non-conductive carbon black, graphene, graphite, carbon fibers, and carbon nanotubes.

In most embodiments, each of the first and second near-infrared absorbers are present in the respective laser-engraveable layers independently in an amount of at least 1 weight % and up to and including 25 weight %, and typically in an amount of at least 5 weight % and up to and including 15 weight %, based on the total dry weight of the respective laser-engraveable layers.

In some embodiments, when the near-infrared radiation absorber, such as a carbon black, is used with an inorganic non-infrared radiation absorber filler in a particular laser-engraveable layer, the weight ratio of the near-infrared radiation absorber to the inorganic non-infrared radiation absorber filler is from 1:40 to 30:1 or typically from 1:30 to 20:1, or more typically from 1:20 to 10:1.

Some useful embodiments of laser-engraveable compositions and layers comprise a conductive or non-conductive carbon black, carbon fibers, or carbon nanotubes as the near-infrared radiation absorber in either or both laser-engraveable layers, as well as silica, calcium carbonate, or both silica and calcium carbonate particles as inorganic non-infrared radiation absorber filler in either or both laser-engraveable layers.

Optional Additives

Useful inorganic non-infrared radiation absorber fillers that can be present in either or both laser-engraveable layers include but not limited to, various silicas (treated, fumed, or untreated), calcium carbonate, magnesium oxide, talc, barium sulfate, kaolin, bentonite, zinc oxide, mica, titanium dioxide, and mixtures thereof. Particularly useful inorganic non-infrared radiation absorbing fillers are silica, calcium carbonate, and alumina, such as fine particulate silica, fumed silica, porous silica, surface treated silica, sold as Aerosil® from Degussa, Utrasil® from Evonik, and Cab-O-Sil® from Cabot Corporation, micropowders such as amorphous magnesium silicate cosmetic microspheres sold by Cabot and 3M Corporation, calcium carbonate and barium sulfate particles and microparticles, zinc oxide, and titanium dioxide, or mixtures of two or more of these materials.

When present, the amount of the non-infrared radiation absorber fillers in either laser-engraveable layer is generally and independently at least 1 weight % and up to and including 75 weight %, or typically at least 5 weight % and up to and including 40 weight %, based on the total dry weight of either laser-engraveable layer. Coupling agents can be added for connection between fillers and all of the polymers in the laser-engraveable layer. An example of a coupling agent is silane (Dynsylan 6498 or Si 69 available from Evonik Degussa Corporation).

Either laser-engraveable layer can further comprise microcapsules that are dispersed generally uniformly within the laser-engraveable layer. These "microcapsules" can also be known as "hollow beads", "hollow spheres", "microspheres", microbubbles", "micro-balloons", "porous beads", or "porous particles". Some microcapsules include a thermoplastic polymeric outer shell and a core of either air or a volatile liquid such as isopentane or isobutane. The microcapsules can comprise a single center core or many voids (pores) within the core. The voids can be interconnected or non-connected. For example, non-laser-ablatable microcapsules can be designed like those described in U.S. Pat. No. 4,060,032 (Evans) and U.S. Pat. No. 6,989,220 (Kanga) in which the shell is composed of a poly[vinylidene-(meth) acrylonitrile] resin or poly(vinylidene chloride), or as plastic micro-balloons as described for example in U.S. Pat. No. 6,090,529 (Gelbart) and U.S. Pat. No. 6,159,659 (Gelbart). The amount of microspheres present in either laser-engraveable layer can be at least 1 weight % and up to and including 15 weight %. Some useful microcapsules are the EXPANCEL® microspheres that are commercially available from Akzo Noble Industries (Duluth, Ga.), Dualite and Micropearl polymeric microspheres that are available from Pierce & Stevens Corporation (Buffalo, N.Y.), hollow plastic pigments that are available from Dow Chemical Company (Midland, Mich.) and Rohm and Haas (Philadelphia, Pa.). The useful microcapsules generally have a diameter of 50 μm or less.

Upon laser-engraving, the microspheres that are hollow or filled with an inert solvent, burst and give a foam-like structure or facilitate ablation of material from the laser-engraveable layer because they reduce the energy needed for ablation.

Optional addenda in either or both laser-engraveable layers can also include but are not limited to, dyes, antioxidants, antiozonants, stabilizers, dispersing aids, surfactants, and adhesion promoters, as long as they do not interfere with laser-engraving efficiency.

Compressible Layer

The flexographic printing precursors of this invention can also comprise an elastomeric rubber layer that is considered a "compressible" layer (also known as a cushioning layer) and is disposed over the substrate and underneath the non-printing laser-engraveable layer. In most embodiments, the compressible layer is disposed directly on the substrate and the non-printing laser-engraveable layer is disposed directly on the compressible layer.

The compressible layer can comprise one or more elastomeric rubbers that also make it laser-engraveable. Any useful elastomeric rubber, or mixture thereof, can be used in the compressible layer. The compressible layer can comprise one or more elastomeric rubbers in an amount of at least 30 weight % and up to and including 80 weight %, or typically of at least 40 weight % and up to and including 70 weight %, based on the total dry weight of the compressible layer.

The compressible layer can also comprise microvoids or microspheres dispersed within the one or more elastomeric rubbers. In most embodiments, the microvoids or microspheres are uniformly dispersed within those elastomeric rubbers. If microvoids are present, they comprise at least 1% and up to and including 15% of the dry compressible layer volume. If microspheres are present, they are present in an amount of at least 1 weight % and up to and including 15 weight %, based on the total dry weight of the compressible layer.

Useful microspheres are described above as "microcapsules", "hollow beads", "hollow spheres", microbubbles", "micro-balloons", "porous beads", or "porous particles", which are dispersed (generally uniformly) within the one or more elastomeric rubbers in the compressible layer.

The compressible layer can also comprise optional addenda such as inorganic non-radiation absorber fillers and other addenda described above for the laser-engraveable layers.

The dry thickness of the compressible layer is generally at least 50 μm and up to and including 4,000 μm, or typically at least 100 μm and up to and including 2,000 μm.

Substrates

The flexographic printing precursors of this invention have a suitable dimensionally stable, non-laser-engraveable substrate having an imaging side and a non-imaging side. The substrate has at least the non-printing laser-engraveable layer and the outermost, non-metallic printing laser-engraveable layer, optionally disposed over a compressible layer, on the imaging side of the substrate. Suitable substrates include dimensionally stable polymeric films, aluminum sheets or cylinders, transparent foams, ceramics, fabrics, or laminates of polymeric films (from condensation or addition polymers) and metal sheets such as a laminate of a polyester and aluminum sheet or polyester/polyamide laminates, or a laminate of a polyester film and a compliant or adhesive support. Polyester, polycarbonate, polyvinyl, and polystyrene films are typically used. Useful polyesters include but are not limited to poly(ethylene terephthalate) and poly(ethylene naphthalate). The substrates can have any suitable thickness, but generally they are at least 0.01 mm or at least 0.05 mm and up to and including 0.5 mm thick. An adhesive layer can be used to secure the compressible layer to the substrate.

Some particularly useful substrates comprise one or more layers of a metal, fabric, or polymeric film, or a combination thereof. For example, a fabric web can be disposed over a polyester or aluminum support using a suitable adhesive. For example, the fabric web can have a thickness of at least 0.1 mm and up to and including 0.5 mm, and the polyester support thickness can be at least 100 μm and up to and including 200 μm, or the aluminum support can have a thickness of at least 200 μm and up to and including 400 μm. The dry adhesive thickness of the substrate can be at least 10 μm and up to and including 80 μm.

There can be a non-laser-engraveable backcoat on the non-imaging side of the substrate that can comprise a soft rubber or foam, or other compliant layer. This non-laser-engraveable backcoat can provide adhesion between the substrate and printing press rollers and can provide extra compliance to the resulting flexographic printing member, or for example to reduce or control the curl of a resulting flexographic printing plate.

Preparation of Flexographic Printing Precursors

The flexographic printing precursors of this invention can be prepared in the following manner.

A non-printing laser-engraveable formulation can be prepared by mixing the desired components (1), (2), and (3) described above in a suitable mixer to form a homogeneous dispersion that can be applied to a suitable substrate such as a fabric web that can be disposed on a polyester support. The layer thickness can be adjusted as desired using suitable means. Solvent can be removed by a suitable drying step, followed by vulcanization if necessary, at a suitable temperature and time to provide a non-printing laser-engraveable layer.

A second formulation can be similarly prepared to make the outermost non-metallic printing laser-engraveable layer. This second formulation is prepared to include one or more second elastomers, one or more second infrared radiation absorbers, and any optional components. The compounded second formulation can be strained to remove undesirable extraneous matter and then fed into a calender to deposit or apply a continuous sheet of the second formulation onto the applied first formulation (non-printing laser-engraveable layer) to provide an outermost non-metallic printing laser-engraveable layer.

Controlling the thickness of the two laser-engraveable layers (sheets) can be accomplished by adjusting the pressure between the calender rolls and the calendering speed during application of the respective formulations. In some cases, where the laser-engraveable formulation does not stick to the calender rollers, the rollers are heated to improve the tackiness of the formulation and to provide some adhesion to the calender rollers.

The continuous laser-engraveable layers (for example, on a fabric web) can then be laminated (or adhered) to a suitable polymeric film such as a polyester film to provide the two laser-engraveable layers on a substrate, for example, the fabric web adhered with an adhesive to the polyester film. The continuous two laser-engraveable layers can be individually ground using suitable grinding apparatus to provide a uniform smoothness and thickness in the continuous laser-engraveable layers. The joint smooth, uniformly thick laser-engraveable layers can then be cut to a desired size to provide suitable flexographic printing plate precursors of this invention.

The process for making flexographic printing sleeves is similar but the compounded first and second formulations can be applied or deposited around a printing sleeve core, and processed to form a continuous laser-engraveable flexographic printing sleeve precursor that can be ground to a uniform thickness using suitable grinding equipment.

Similarly, continuous calendered laser-engraveable layers on a fabric web can be deposited around a printing cylinder and processed to form a continuous flexographic printing cylinder precursor.

The flexographic printing precursor can also be constructed with a suitable protective layer or slip film (with release properties or a release agent) in a cover sheet that is removed prior to laser-engraving. The protective layer can be a polyester film [such as poly(ethylene terephthalate)] forming the cover sheet.

Laser-Engraving Imaging to Prepare Flexographic Printing Members, and Flexographic Printing Laser engraving can be accomplished using a near-IR radiation emitting diode or carbon dioxide or Nd:YAG laser. It is desired to laser engrave one or both laser-engraveable layers to provide a relief image with a minimum dry depth of at least 50 μm or typically of at least 100 μm. More likely, the minimum relief image depth is at least 300 μm and up to and including 4000 μm or up to 1000 μm being more desirable. Relief is defined as the difference measured between the floor of the imaged flexographic printing member and its outermost printing surface. The relief image can have a maximum depth up to 100% of the original total dry thickness of both laser-engraveable layers and compressible layer if present. In such instances, the floor of the relief image can be the substrate if all layers are completely removed in the imaged regions.

A semiconductor near-infrared radiation laser or array of such lasers operating at a wavelength of at least 700 nm and up to and including 1300 nm can be used, and a diode laser operating at from 800 nm to 1250 nm is particularly useful for laser-engraving.

Generally, laser-engraving is achieved using at least one near-infrared radiation laser having a minimum fluence level of at least 20 $J/cm^2$ at the imaged surface and typically near-infrared imaging fluence is at least 20 J/cm$^2$ and up to and including 1,000 J/cm$^2$ or typically at least 50 J/cm$^2$ and up to and including 800 J/cm$^2$.

A suitable laser engraver that would provide satisfactory engraving is described in WO 2007/149208 (Eyal et al.) that is incorporated herein by reference. This laser engraver is considered to be a "high powered" laser ablating imager or engraver and has at least two laser diodes emitting radiation in one or more near-infrared radiation wavelengths so that imaging with the one or more near-infrared radiation wavelengths is carried out at the same or different depths relative to the outer surface of the outermost non-metallic printing laser-engraveable layer. For example, the multi-beam optical head described in the noted publication incorporates numerous laser diodes, each laser diode having a power in the order of at least 10 Watts per emitter width of 100 μm. These lasers can be modulated directly at relatively high frequencies without the need for external modulators.

Thus, laser-engraving (laser imaging) can be carried out at the same or different relief image depths relative to the outer surface of the outermost non-metallic printing laser-engraveable layer using two or more laser diodes, each laser diode emitting near-infrared radiation in one or more wavelengths.

Other imaging (or engraving) devices and components thereof and methods are described for example in U.S. Patent Application Publications 2008/0153038 (Siman-Tov et al.) describing a hybrid optical head for direct engraving, 2008/0305436 (Shishkin) describing a method of imaging one or more graphical pieces in a flexographic printing plate precursor on a drum, 2009/0057268 (Aviel) describing imaging devices with at least two laser sources and mirrors or prisms put in front of the laser sources to alter the optical laser paths, and 2009/0101034 (Aviel) describing an apparatus for providing an uniform imaging surface, all of which publications are incorporated herein by reference. In addition, U.S. Patent Application Publication 2011/0014573 (Matzner et al.) describes an engraving system including an optical imaging head, a printing plate construction, and a source of imaging near-infrared radiation, which publication is incorporated herein by reference. U.S. Patent Application Publication 2011/0058010 (Aviel et al.) describes an imaging head for 3D imaging of flexographic printing plate precursors using multiple lasers, which publication is also incorporated herein by reference.

Thus, a system for providing flexographic printing members including flexographic printing plates, flexographic printing cylinders, and flexographic printing sleeves includes one or more of the flexographic printing precursors of this invention, as well as one or more groups of one or more sources of imaging (engraving) with near-infrared radiation, each source capable of emitting near-infrared radiation (see references cited above) of the same or different wavelengths. Such imaging sources can include but are not limited to, laser diodes, multi-emitter laser diodes, laser bars, laser stacks, fiber lasers, and combinations thereof. The system can also include one or more sets of optical elements coupled to the sources of imaging (engraving) near-infrared radiation to direct imaging near-infrared radiation from the sources onto the flexographic printing precursor (see references cited above for examples of optical elements).

Engraving to form a relief image can occur in various contexts. For example, sheet-like elements can be imaged and used as desired, or wrapped around a printing sleeve core or cylinder form before imaging. The flexographic printing precursor can also be a flexographic printing sleeve precursor or flexographic printing cylinder precursor that can be imaged.

During imaging, products from the engraving can be gaseous or volatile and readily collected by vacuum for disposal or chemical treatment. Any solid debris from engraving can be collected and removed using suitable means such as vacuum, compressed air, brushing with brushes, rinsing with water, ultrasound, or any combination of these.

During printing, the resulting flexographic printing member, for example, flexographic printing plate, flexographic printing cylinder, or printing sleeve, is typically inked using known methods and the ink is appropriately transferred to a suitable substrate such as papers, plastics, fabrics, paperboard, metals, particle board, wall board, or cardboard.

After printing, the flexographic printing plate or sleeve can be cleaned and reused and a flexographic printing cylinder can be scraped or otherwise cleaned and reused as needed. Cleaning can be accomplished with compressed air, water, or a suitable aqueous solution, or by rubbing with cleaning brushes or pads.

Imaging in this method can be carried out using a high power laser ablating imager, for example, wherein imaging is carried out at the same or different depths relative to the surface of the laser-engraveable layers using two or more laser diodes each emitting radiation in one or more wavelengths.

The present invention also provides at least the following embodiments and combinations thereof, but other combinations of features are considered to be within the present invention as a skilled artisan would appreciate from the teaching of this disclosure:

1. A flexographic printing precursor that is laser-engraveable to provide a relief image, the flexographic printing precursor comprising a substrate, and having disposed over the substrate, in order:

a non-printing laser-engraveable layer comprising: (1) a first elastomer, (2) a polymer that is nitrocellulose, a polymer comprising a triazene group, a glycidyl azide polymer, or a poly(vinyl nitrate), and (3) a first near-infrared radiation absorber, and an outermost non-metallic printing laser-engraveable layer disposed over the non-printing laser-engraveable layer, the outermost non-metallic, printing laser-engraveable layer comprising: (1) a second elastomer and (2) a second near-infrared radiation absorber, wherein the non-printing laser-engraveable layer is more sensitive to laser irradiation at a wavelength of at least 700 nm and up to and including 1300 nm than the outermost non-metallic printing laser-engraveable layer.

2. The flexographic printing precursor of embodiment 1, wherein the first and second near-infrared radiation absorbers are the same or different and selected from the group consisting of a conductive or non-conductive carbon black, graphene, graphite, carbon fibers, and carbon nanotubes, and each are present in the respective layers independently in an amount of at least 1 weight % and up to and including 25 weight %, based on the total dry weight of the respective laser-engraveable layers.

3. The flexographic printing precursor of embodiment 1 or 2, wherein the outermost non-metallic printing laser-engraveable layer has a dry thickness of at least 100 μm 4. The flexographic printing precursor of any of embodiments 1 to 3, wherein the outermost non-metallic printing laser-engraveable layer comprises a polyurethane as the second elastomer.

5. The flexographic printing precursor of any of embodiments 1 to 4, wherein the non-printing laser-engraveable layer comprises a polyurethane as the first elastomer.

6. The flexographic printing precursor of any of embodiments 1 to 5, wherein the weight ratio of the (1) first elastomer to the (2) polymer is from 1:1 to and including 16:1.

7. The flexographic printing precursor of any of embodiments 1 to 6, wherein the non-printing laser-engraveable layer comprises the (2) polymer in an amount of at least 5 weight % and up to and including 20 weight %, based on the total dry weight of the non-printing laser-engraveable layer.

8. The flexographic printing precursor of any of embodiments 1 to 7, wherein the substrate comprises one or more layers of a metal, fabric, or polymeric film, or a combination thereof.

9. The flexographic printing precursor of any of embodiments 1 to 8, wherein the substrate comprises a fabric web disposed over a polyester or aluminum support.

10. The flexographic printing precursor of any of embodiments 1 to 9, wherein the outermost non-metallic printing laser-engraveable layer has a dry thickness of at least 250 μm and up to and including 4,000 μm.

11. The flexographic printing precursor of any of embodiments 1 to 10, wherein the non-printing laser-engraveable layer has a dry thickness of at least 250 μm and up to and including 4,000 μm.

12. The flexographic printing precursor of any of embodiments 1 to 11, wherein the non-printing laser-engraveable layer comprises a polyurethane, a carbon black and nitrocellulose, and the outermost non-metallic, printing laser-engraveable layer comprises a polyurethane and a carbon black.

13. A method for providing a flexographic printed impression, comprising:

imaging the flexographic printing precursor of any of embodiments 1 to 12 using near-infrared radiation to provide a flexographic printing member with a relief image.

14. The method of embodiment 13 further comprising:

applying ink to the flexographic printing member having the relief image, and transferring ink from the flexographic printing member to a receiver element to provide a printed impression.

15. The method of embodiment 13 or 14, comprising imaging to provide a minimum dry relief image depth of at least 50 μm.

16. The method of any of embodiments 13 to 15, wherein the imaging is laser-engraving at a wavelength of at least 700 nm and up to and including 1300 nm.

17. A method for making a flexographic printing precursor of any of embodiments 1 to 12, comprising:

forming a non-printing laser-engraveable layer over a substrate, the non-printing laser-engraveable layer comprising: (a) a first elastomer, (2) a polymer that is nitrocellulose, a polymer comprising a triazene group, a glycidyl azide polymer, or a poly(vinyl nitrate), and (3) a first near-infrared radiation absorber, and forming an outermost non-metallic printing laser-engraveable layer over the non-printing laser-engraveable layer, the outermost non-metallic, printing laser-engraveable layer comprising: (1) a second elastomer and (2) a second near-infrared radiation absorber, wherein the formed non-printing laser-engraveable layer is more sensitive to laser irradiation at a wavelength of at least 700 nm and up to and including 1300 nm than the formed outermost non-metallic printing laser-engraveable layer.

The following Invention Example illustrates the practice of this invention and is not meant to be limiting in any manner.

COMPARATIVE EXAMPLE 1

A laser-engraveable layer was formulated using a mixture of 60 weight % of a polycarbonate diol (Desmophen® 2613 available from Bayer Material Science) and 18 weight % of an aliphatic polyisocyanate (Desmodur® XP 2410 available from Bayer Material Science) that formed a polyurethane. The components (% by weight) shown in TABLE I below were used to prepare the formulation.

TABLE I

| Formulation Component | Amount (weight %) |
|---|---|
| Desmophen ® 2613 | 64.2 |
| Desmodur ® XP 2410 | 19 |
| Silica (inorganic non-infrared radiation absorber filler) | 6 |
| Carbon black | 10 |
| Z-6040 silane coupling agent | 0.4 |
| Dibutyltin dilaurate | 0.4 |

The formulation was mixed for about 10 minutes in a mixer and then 5 minutes in a 3-roll mixer, removed as a homogenous dispersion that was then coated onto a polyester film to provide a continuous roll of coated laser-engraveable layer that was then fed into an oven at 140° C. for a suitable period of time. This was repeated (coating and polymerization) until a desired thickness was obtained.

The resulting flexographic printing precursor had a Durometer hardness of 80 Shore A and was cut into samples of appropriate size and that were placed on a laser-engraving plate imager to produce an excellent, sharp, and deep relief image that was used on a flexographic printing press to produce hundreds of thousands of sharp, clean impressions.

The sensitivity of this flexographic printing precursor to laser engraving energy was measured as the amount of energy per unit area to engrave a certain depth and was determined to be 0.56 J/cm$^2$ per μm.

INVENTION EXAMPLE 1

Comparative Example 1 was repeated except that the flexographic printing precursor was prepared with two laser-engraveable layers with the underlying non-printing laser-engraveable layer being more sensitive to infrared radiation engraving than the outermost non-metallic printing laser-engraveable layer.

The underlying non-printing laser-engraveable layer comprised the components shown above in TABLE I but with the addition of nitrocellulose (7 weight %).

The outermost non-metallic printing laser-engraveable layer was formulated with the same formulation described in Comparative Example 1 and applied to the non-printing laser-engraveable layer.

Both of the laser-engraveable layers were determined to have the same Durometer hardness of 80 Shore A. The resulting flexographic precursor was cut to an appropriate size and placed on a laser-engraving plate imager to produce an excellent, sharp, and deep relief image that was used on a flexographic printing press to produce hundreds of thousands of sharp, clean impressions.

The sensitivity of the flexographic printing precursor to laser engraving energy was measured, in each layer, as the amount of energy per unit area to engrave a certain depth and was found to be 0.56 J/cm$^2$ per μm in the underlying non-printing laser-engraveable layer and 0.4 J/cm$^2$ per μm (28% improvement) in the outermost non-metallic printing laser-engraveable layer.

COMPARATIVE EXAMPLE 2

Comparative Example 1 was repeated except that the flexographic printing precursor was prepared with a single laser-engraveable layer that was made more sensitive than the outermost non-metallic printing laser-engraveable layer of Comparative Example 1 to infrared radiation because of the addition of 7 weight % of nitrocellulose to the components of TABLE I.

The resulting flexographic printing precursor had a Durometer hardness of 80 Shore A and was cut to an appropriate size and placed on a laser-engraving plate imager to produce an excellent, sharp, and deep relief image that was used on a flexographic printing press to produce hundreds of thousands of impressions. The flexographic printing plate demonstrated poor printing performance as evidenced by curly lines that were not evident in the impressions produced in either Comparative Example 1 or Invention Example 1.

The sensitivity of the flexographic printing precursor to laser engraving energy was measured to be 0.4 $J/cm^2$ per μm, representing a 28% improvement over Comparative Example 1.

The invention has been described in detail with particular reference to certain preferred embodiments thereof, but it will be understood that variations and modifications can be effected within the spirit and scope of the invention.

The invention claimed is:

1. A flexographic printing precursor that is laser-engraveable to provide a relief image, the flexographic printing precursor consisting essentially of a substrate, and, in order:

a non-printing laser-engraveable layer that is directly disposed on the substrate, which non-printing laser-engraveable layer has a dry thickness of at least 300 μm and up to and including 2,500 μm and comprises: (1) at least 40 weight % and up to and including 80 weight % of a first elastomer, (2) at least 5 weight % and up to and including 20 weight %, of a polymer that is nitrocellulose, a polymer comprising a triazene group, a glycidyl azide polymer, or a poly(vinyl nitrate), and (3) at least 5 weight % and up to and including 15 weight % of a first near-infrared radiation absorber, all amounts based on the total dry weight of the non-printing laser-engraveable layer, and an outermost non-metallic printing laser-engraveable layer disposed over the non-printing laser-engraveable layer, the outermost non-metallic, printing laser-engraveable layer having a dry thickness of at least 250 μm and up to and including 4,000 μm and comprising: (1) a second elastomer and (2) at least 1 weight % and up to and including 25 weight % of a second near-infrared radiation absorber, the amount based on the total dry weight of the outermost non-metallic printing laser-engraveable layer, wherein the non-printing laser-engraveable layer is more sensitive to laser irradiation at a wavelength of at least 700 nm and up to and including 1300 nm than the outermost non-metallic printing laser-engraveable layer.

2. The flexographic printing precursor of claim 1, wherein the first and second near-infrared radiation absorbers are the same or different and are selected from the group consisting of a conductive or non-conductive carbon black, graphene, graphite, carbon fibers, and carbon nanotubes.

3. The flexographic printing precursor of claim 1, wherein the outermost non-metallic printing laser-engraveable layer comprises a polyurethane as the second elastomer.

4. The flexographic printing precursor of claim 1, wherein the non-printing laser-engraveable layer comprises a polyurethane as the first elastomer.

5. The flexographic printing precursor of claim 1, wherein the weight ratio of the (1) first elastomer to the (2) polymer is from 3:1 to and including 9:1.

6. The flexographic printing precursor of claim 1, wherein the substrate comprises one or more layers of a metal, fabric, or polymeric film, or a combination thereof.

7. The flexographic printing precursor of claim 1, wherein the substrate comprises a fabric web disposed over a polyester or aluminum support.

8. The flexographic printing precursor of claim 1, wherein the non-printing laser-engraveable layer comprises a polyurethane, a carbon black and nitrocellulose, and the outermost non-metallic, printing laser-engraveable layer comprises a polyurethane and a carbon black.

9. A method for providing a flexographic printed impression, comprising:

without forming and using a mask, imaging the flexographic printing precursor of claim 1 using laser-engraving near-infrared radiation to provide a flexographic printing member with a relief image in at least the outermost non-metallic printing laser-engraveable layer.

10. The method of claim 9 further comprising:

without development of the flexographic printing member, applying ink to the flexographic printing member having the relief image, and transferring ink from the flexographic printing member to a receiver element to provide a printed impression.

11. The method of claim 9, comprising imaging to provide a minimum dry relief image depth of at least 300 μm in at least the outermost non-metallic printing laser-engraveable layer.

12. The method of claim 9, wherein the imaging is laser-engraving at a wavelength of at least 700 nm and up to and including 1300 nm.

13. A method for making a flexographic printing precursor, consisting of:

forming a non-printing laser-engraveable layer directly on a substrate, the non-printing laser-engraveable layer having a dry thickness of at least 300 μm and up to and including 2,500 μm and comprising: (1) at least 40 weight % and up to and including 80 weight % of a first elastomer, (2) at least 5 weight % and up to and including 20 weight of a polymer that is nitrocellulose, a polymer comprising a triazene group, a glycidyl azide polymer, or a poly(vinyl nitrate), and (3) at least 5 weight % and up to and including 15 weight % of a first near-infrared radiation absorber, all amounts based on the total dry weight of the non-printing laser-engraveable layer, and forming an outermost non-metallic printing laser-engraveable layer directly on the non-printing laser-engraveable layer, the outermost non-metallic, printing laser-engraveable layer having a dry thickness of at least 250 μm and up to and including 4,000 μm and comprising: (1) a second elastomer and (2) at least 1 weight % and up to and including 25 weight % of a second near-infrared radiation absorber, the amount based on the total dry weight of the outermost non-metallic printing laser-engraveable layer, wherein the formed non-printing laser-engraveable layer is more sensitive to laser irradiation at a wavelength of at least 700 nm and up to and including 1300 nm than the formed outermost non-metallic printing laser-engraveable layer.

* * * * *